July 26, 1955     B. B. SMITHEY     2,713,717
ELECTRIC DEHORNER
Filed May 13, 1954
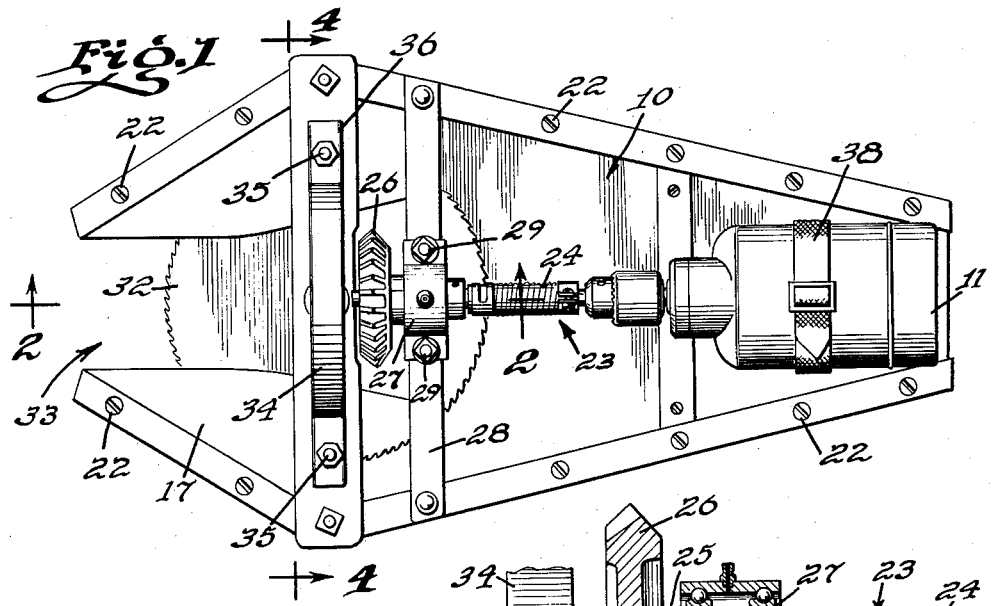
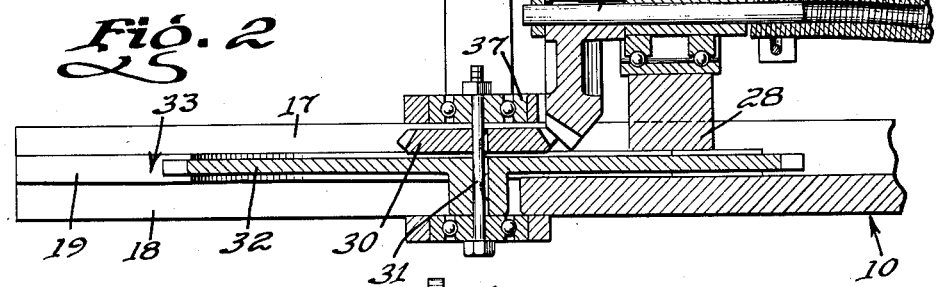
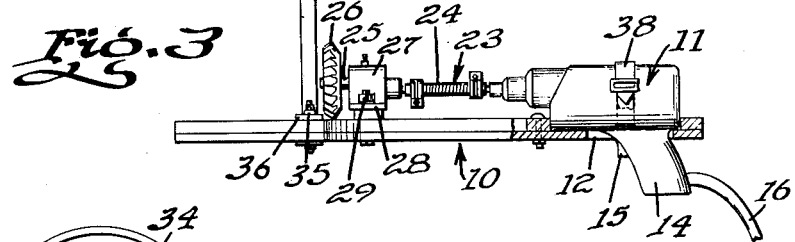
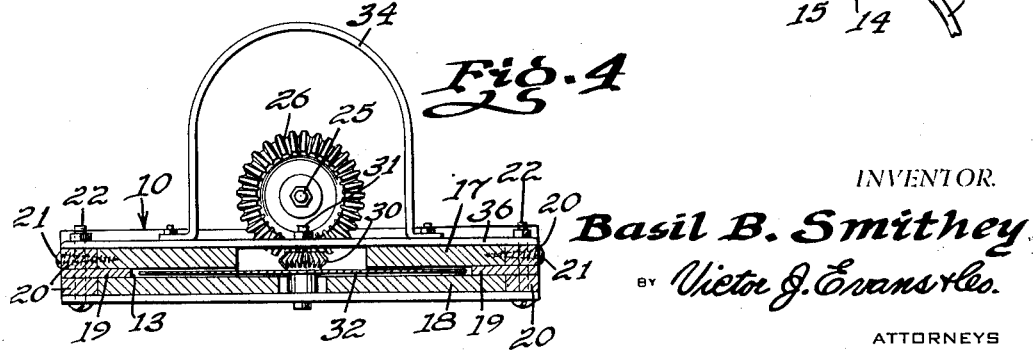
INVENTOR.
Basil B. Smithey
BY Victor J. Evans & Co.
ATTORNEYS

United States Patent Office 2,713,717
Patented July 26, 1955

2,713,717

ELECTRIC DEHORNER

Basil B. Smithey, Weslaco, Tex.

Application May 13, 1954, Serial No. 429,501

1 Claim. (Cl. 30—167)

This invention relates to a cutting device, and more particularly to an electric dehorner for cutting or trimming the horns of animals.

The object of the invention is to provide an electric dehorner which will easily and quickly trim or cut horns off of animals such as cows.

Another object of the invention is to provide an electric dehorner which includes a motor that is adapted to be connected to a suitable source of electrical energy, there being a circular saw driven by the motor and wherein the motor and saw are mounted on a base that is provided with a cutout for safely permitting the horn to be arranged in engagement with the high speed circular saw.

A further object of the invention is to provide an electric dehorner which is extremely simple and inexpensive to manufacture Other objects and advantages will be apparent during the course of the following description.

In the accompanying drawings, forming a part of this application, and in which like numerals are used to designate like parts throughout the same:

Figure 1 is a top plan view of the electric dehorner, constructed according to the present invention.

Figure 2 is a sectional view taken on the line 2—2 of Figure 1.

Figure 3 is a side elevational view of the dehorner, with parts broken away and in section.

Figure 4 is a sectional view taken on the line 4—4 of Figure 1.

Referring in detail to the drawings, the numeral 10 designates a base which can be made of any suitable material such as wood or metal, and detachably mounted on the base 10 is a motor 11. The motor 11 is adapted to be connected to a suitable source of electrical energy by means of a wire 16, Figure 3. The base 10 may be provided with a slot 12 through which projects the handle 14 of the motor 11, and the handle 14 may have the trigger 15 thereon.

The front portion of the base 10 may be formed as shown in Figure 4 and may include an upper plate 17 and a lower plate 18, the plates 17 and 18 being spaced apart to define a channel 13 for a purpose to be later described. Spacer members 19 are interposed between the pair of plates 17 and 18 for maintaining the plates in their proper spaced apart relation. Strips 20 may be secured to the ends of the plates 17 and 18 by suitable securing elements such as nails or screws 21, and suitable bolt and nut assemblies 22 interconnect the upper and lower strips together and also to the spacer members 19 so as to maintain the parts in their proper assembled relation.

Driven by the motor 11 is a drive shaft 23 which includes a flexible portion 24, and the shaft 23 further includes a cylindrical portion 25 which has a gear member 26 keyed thereon. The cylindrical portion 25 of the drive shaft 23 is rotatably supported by a bearing assembly 27 which is secured to a bar 28 by suitable bolt and nut assemblies 29.

The gear member 26 meshes with a second gear member 30, and the gear member 30 is keyed to a driven shaft 31 which is arranged at right angles with respect to the drive shaft 23. A circular saw 32 is also keyed to the driven shaft 31, and it will be seen from Figure 2 of the drawings that when the motor 11 is actuated by means of the trigger 15, the shaft 23 will rotate to thereby cause high speed rotation of the circular saw 32 due to the intermeshing gears 26 and 30. The front of the base 10 is provided with a cutout 33 whereby the horn of an animal such as a cow can be received in the cutout 33 and engaged by the rotating saw 32 to thereby dehorn or sever the horns from the animal without danger to the operator. For facilitating handling of the dehorner of the present invention, a handle 34 is secured to a beam 36 by suitable bolt and nut assemblies 35. Ball bearing assemblies 37 are provided for rotatably supporting the driven shaft 31, and the motor 11 is detachably connected to the base 10 by means of a suitable flexible strap 38, Figures 1 and 3.

From the foregoing it is apparent that there has been provided a device for dehorning animals such as cows, steers, bulls, goats and the like. In use the dehorner can be gripped by means of the handle 34 and the other hand of the operator can be arranged in engagement with the handle 14 and the trigger 15. Then, the dehorner can be moved into engagement with the horn to be severed through the medium of the cutout 33 so that the rotating saw 32 will engage and sever the horn of the animal. The cutout 33 provides a mouth or opening which will prevent injury to the operator from the rotating saw 32 and the flexible shaft portion 24 insures that there will be no breakage of parts in the event an obstacle is encountered. The strap 38 permits the motor 11 to be removed when desired. The saw 32 rotates partially in the channel 13 formed between the plates 17 and 18. The base can be made of any suitable material such as wood or metal and the saw 32 and gear 30 are keyed to the shaft 31, while the gear 26 is keyed to the shaft 23. The gear 26 is much larger than the gear 30 so that the saw 32 will rotate at an exceptionally high speed whereby the horn can be quickly and easily severed. With the present invention the horns will not be mashed or crushed but will be clipped off neatly and quickly.

I claim:

In an electric dehorner, a base provided with a slot adjacent one end thereof, an electric motor mounted on said base and including a handle projecting through said slot, a bar secured to said base, a bearing assembly mounted on said bar, a drive shaft mounted on said bearing and connected to said motor and including a flexible portion, said base being provided with a cutout for receiving therein the horn to be severed, said base including a pair of plates, spacer members interposed between said pair of plates and defining therebetween a channel, a circular saw rotatably positioned in said channel, strips arranged along the longitudinal edges of said plates and secured thereto, a gear member mounted on said drive shaft, a driven shaft extending through said saw and arranged at right angles with respect to said drive shaft, and a gear member smaller than said first named gear member mounted on said driven shaft, said gear members being arranged in meshing engagement with each other.

References Cited in the file of this patent

UNITED STATES PATENTS

| | | |
|---|---|---|
| 1,833,828 | Diebert | Nov. 24, 1931 |
| 2,248,694 | Boyette | July 8, 1941 |
| 2,342,052 | Jimerson et al. | Feb. 15, 1944 |
| 2,490,255 | Chase | Dec. 6, 1949 |
| 2,544,461 | Lietzel | Mar. 6, 1951 |
| 2,645,011 | Otis | July 14, 1953 |
| 2,702,569 | Yelle | Feb. 22, 1955 |